July 26, 1938.  E. E. HEWITT ET AL  2,125,164
LOAD BRAKE DEVICE
Filed Oct. 2, 1935  3 Sheets-Sheet 3

INVENTORS
ELLIS E. HEWITT
ELLERY R. FITCH
BY *Wm. M. Cady*
ATTORNEY

Patented July 26, 1938

2,125,164

UNITED STATES PATENT OFFICE 2,125,164

LOAD BRAKE DEVICE

Ellis E. Hewitt, Edgewood, and Ellery R. Fitch, Irwin, Pa., assignors to The Westinghouse Air Brake Company, Wilmerding, Pa., a corporation of Pennsylvania Application October 2, 1935, Serial No. 43,142

35 Claims. (Cl. 303—23)

This invention relates to fluid pressure brakes and more particularly to a fluid pressure brake equipment in which the brakes are applied with greater force on loaded cars than on empty cars.

It has heretofore been proposed to provide a brake equipment in which a plurality of brake cylinders are employed, including an empty brake cylinder and a load brake cylinder, the empty brake cylinder being supplied with fluid under pressure during both empty and load operation of the equipment, while the load cylinder is supplied with fluid only during load operation of the equipment.

In certain of these systems an additional reservoir is provided from which fluid is supplied during load operation of the equipment, while in other systems latch means is employed to connect the load brake cylinder to the brake lever so that the brake lever may be moved by the empty brake cylinder to take up the slack in the brake rigging and to press the brake shoes against the wheels without effecting movement of the piston of the load brake cylinder, whereby on the subsequent supply of fluid to the load brake cylinder the piston of the load brake cylinder will be immediately effective to exert a force on the brake lever to increase the degree of application of the brakes with the result that a very small volume of air will be required to operate the load brake cylinder.

It is the principal object of this invention to provide a braking system of the type referred to and incorporating means operative when the equipment is conditioned for load braking to cut off the supply of fluid to the load brake cylinder until the pressure of the fluid supplied to the empty brake cylinder has increased to a predetermined value which is sufficient to cause the empty brake cylinder to move the brake lever to a position to take up the slack in the brake rigging and to press the brake shoes against the wheels, this means being operative thereafter to vary the pressure of the fluid supplied to the load brake cylinder in accordance with variations in the pressure of the fluid supplied to the empty brake cylinder.

A further object of this invention is to provide a braking system of the type referred to and having means to insure that during the release of the brakes, fluid will be completely released from the load brake cylinder before it is entirely released from the empty brake cylinder, whereby the possibility of damage to the latch mechanism associated with the load brake cylinder is eliminated.

Another object of the invention is to provide means to charge the load reservoir directly from the brake pipe, the charging of this reservoir being controlled by the brake controlling valve device without affecting in any way the normal functions or the normal operation of the brake controlling valve device.

A further object of the invention is to provide an empty and load brake equipment having a load reservoir which is charged directly from the brake pipe, the charging of this reservoir being controlled by the brake controlling valve device which controls the supply and release of fluid under pressure to and from the empty brake cylinder, this valve device being operated to permit charging of the load reservoir on movement to the position to release fluid from the empty brake cylinder, and being operative to cut off the charging of the load brake cylinder in all other positions of the said valve device.

Another object of the invention is to provide an improved empty and load brake equipment.

Other objects of the invention and features of novelty will be apparent from the following description taken in connection with the accompanying drawings, in which Fig. 1 is a diagrammatic view, largely in section, of a brake equipment embodying this invention.

Figure 1:
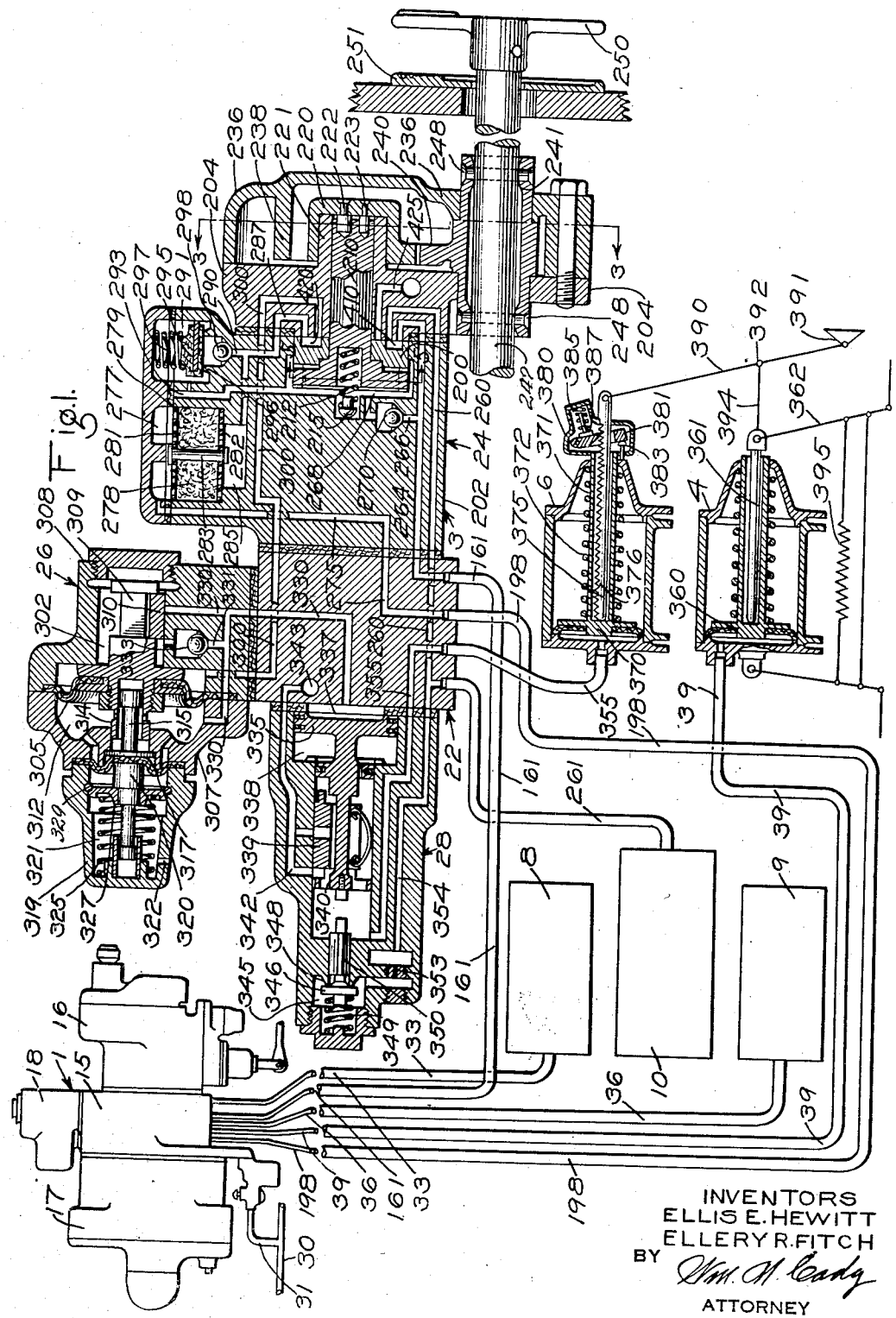

Referring to the drawings, the brake equipment provided by this invention comprises a brake controlling valve device indicated generally by the reference character 1, a control device indicated generally by the reference character 3, an empty brake cylinder 4, a load brake cylinder 6, an auxiliary reservoir 8, an emergency reservoir 9, and a load reservoir 10.

The brake controlling valve device 1 comprises a pipe bracket section 15, to which is secured a service portion 16, an emergency portion 17, and a charging and release valve mechanism 18.

The control device 3 comprises a pipe bracket section 22 to which is secured a changeover valve device 24, a transfer valve device 26, and a relay valve device 28.

The service and emergency portions 16 and 17 of the brake controlling valve device 1 are identical in construction and operation with the corresponding valve portions shown in the patent of Clyde C. Farmer, No. 2,031,213, and only such parts of these valve portions are illustrated and described in connection with this brake equipment as are essential to the understanding of the operation of this brake equipment.

The brake pipe 30 is connected by way of a pipe 31 to a passage 32 in the pipe bracket section 15 of the brake controlling valve device 1, the auxiliary reservoir 8 is connected by way of a pipe 33 with a passage 35 in the pipe bracket section 15, the emergency reservoir 9 is connected by way of a pipe 36 with a passage 38 in the pipe bracket section 15, and the empty brake cylinder 4 is connected by way of a pipe 39 with a passage 40 in the pipe bracket section 15.

The passage 32 communicates with a chamber 42 in the pipe bracket section outwardly of an air straining unit 43, while the chamber 44 within the air straining unit 43 is connected to a chamber 45 in the service portion 16 on one side of the piston 48 which has on the other side thereof a valve chamber 49 in which is mounted a main slide valve 52, and an auxiliary slide valve 53, which are adapted to be operated by means of a piston stem 56. The passage 35 communicates with the valve chamber 49, while the passage 38 communicates with a port in the seat of the main slide valve 52.

The emergency portion 17 has a bore therein in which is mounted a piston 60 having on one side thereof a piston chamber 62 which is in communication with the chamber 44 within the air straining unit 43 by way of a passage 65, and which has on the other side thereof a valve chamber 66 in which is mounted a main slide valve 67 and an auxiliary slide valve 69 which are operated by means of the piston stem 70.

The valve chamber 66 communicates with a volume chamber 63 by way of a passage 64, having a restricted passage 68 leading therefrom, which when the piston 60 is in the position in which it is shown in the drawings, communicates with the chamber 62 on the side of the piston opposite from the valve chamber 66.

The emergency portion 17 has formed therein a valve chamber 75 which is in communication with a port in the seat of the slide valve 52 of the service portion 16 by way of a passage 76, and which has mounted therein a valve 78 which is urged by means of a spring 82 into engagement with a seat rib 79 surrounding a passage 81 so as to control communication between the chamber 75 and a chamber 85 by way of the passage 81.

The emergency portion 17 also has formed therein a bore in which is mounted a movable abutment in the form of a piston 88 having on one face thereof a sealing gasket 89, which is urged into engagement with a seat rib 91 by means of a spring 93 mounted in the chamber 94 on the opposite face of the piston.

The chamber 95 within the seat rib 91 is in constant communication with the chamber 85 by way of a passage 97, while the movable abutment 88 has associated therewith a stem 100, which, when the sealing gasket 89 is in engagement with the seat rib 91, engages the valve 78 to hold it away from the seat rib 79.

The valve chamber 75 also communicates with the chamber 85 by way of a restricted passage 102, while the chamber 85 is in constant communication with a passage 110.

The emergency portion 17 includes, in addition, a timing valve mechanism indicated generally by the reference character 120 and comprising a movable abutment in the form of a diaphragm 121, which is subject on one side to the pressure of the fluid in a chamber 123, which is in constant communication with the valve chamber 66 by way of a passage 126. On the other side of the diaphragm 121 is positioned a valve element 128, which is normally held in engagement with a seat rib 130 surrounding a chamber 132 which is in constant communication with the passage 76 by way of a passage 135, while the chamber 133 outwardly of the seat rib 130 communicates with the passage 110 by way of a passage 140 having a choke or restricted portion 142 interposed therein. The passage 135 has a branch passage 145 leading therefrom and connecting with a port in the seat of the slide valve 67 of the emergency valve portion 17, while the passage 38 also communicates with a port in the seat of the slide valve 67.

The charging and release valve mechanism 18 comprises a movable abutment in the form of a diaphragm 150 which is subject on one side to the pressure of the fluid in the chamber 152, which is connected by way of a passage 154 with a port in the seat of the slide valve 52 of the service portion 16. The diaphragm 150 is subject on the other side to the pressure of the fluid in a chamber 156 which communicates by way of a restricted portion or choke 158 with a passage 160 to which is connected the pipe 161 which leads to the pipe bracket portion of the control device 3.

Figure 2:
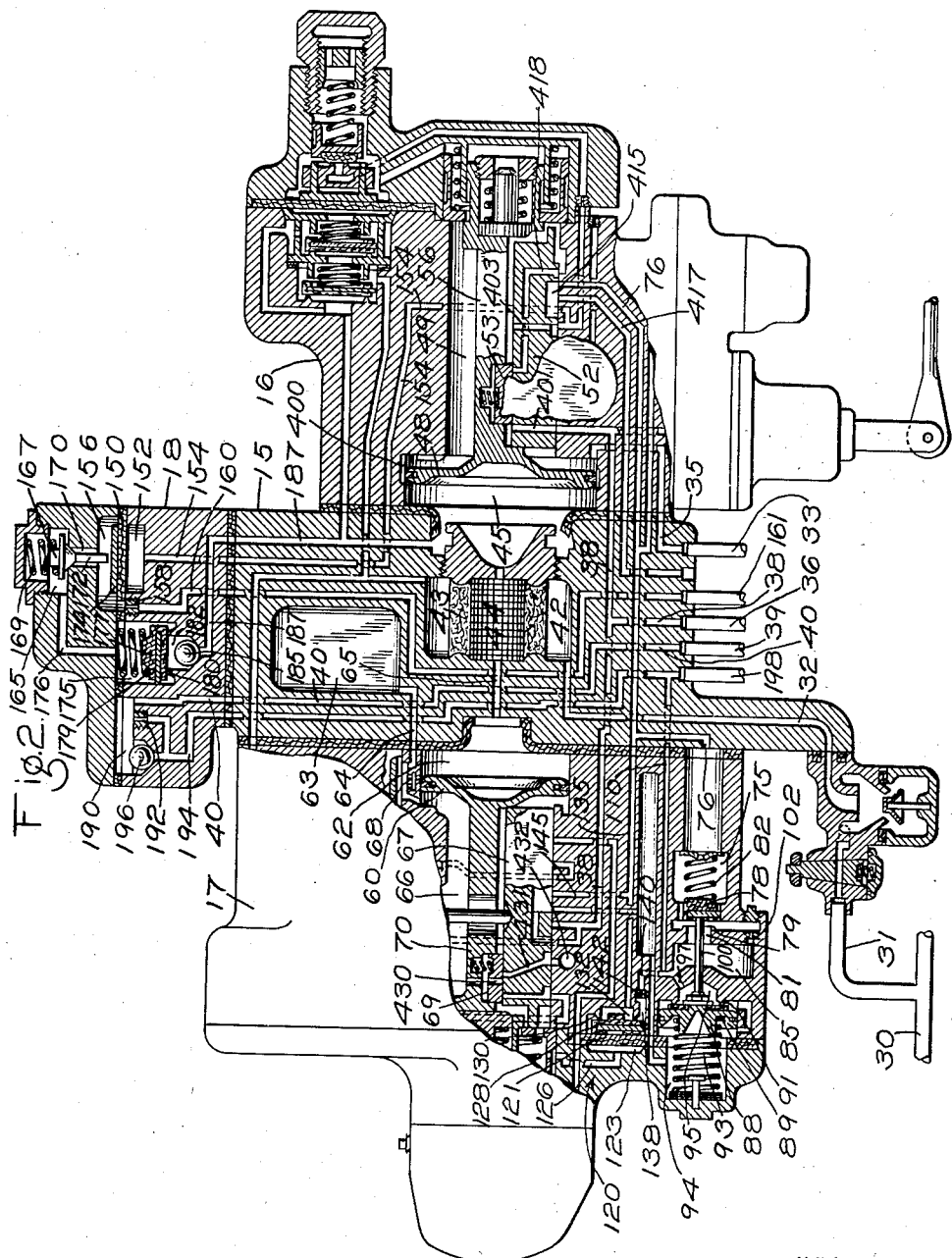
Fig. 2 is a view partly in section of the brake controlling valve device employed in the equipment shown in Fig. 1.

The charging and release valve mechanism 18 has a valve chamber 165 formed therein in which is mounted a valve 167 which is urged by a spring 169 into engagement with a seat surrounding the passage 170 which communicates with the chamber 156. The valve 167 has a stem 172 positioned in the passage 170 and adapted to be engaged by a follower plate 174 associated with the diaphragm 150 on upward movement of the diaphragm 150 from the position in which it is shown in Fig. 2 of the drawings.

The valve chamber 165 is in constant communication by way of a passage 176 with a chamber 175, in which is positioned a valve 177 which is urged by a spring 179 into engagement with a seat rib 180 surrounding a chamber 182, in which is mounted a ball valve element 185 which is normally in engagement with a seat surrounding the end of a passage 187 which communicates with the piston chamber 45 of the service portion 16, and thereby with the brake pipe 30 by way of the chamber 44 within the air straining unit 43, the chamber 42 outwardly thereof, and the passage 32.

The charging and release valve mechanism 18 includes, in addition, a valve chamber 190 which is in constant communication through a choke or restricted portion 192 with a passage 194 which communicates with the passage 110.

The chamber 190 has mounted therein a ball valve element 196 which is normally held in engagement with a seat surrounding a passage communicating with the passage 194 so as to cut off communication between the chamber 190 and the passage 194 by way of the passage controlled by the ball valve element, but to permit communication from the passage 194 to the chamber 190 past the ball check valve 196.

The chamber 190 also communicates with the pipe 39 by way of a passage 40.

The passage 110 also communicates with a pipe 198 which is connected to a passage in the pipe bracket section 22 of the control device 3.

Figure 5:
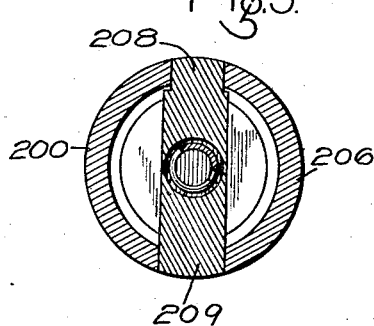
Fig. 5 is a sectional view taken substantially along the line 5—5 of Fig. 1.

The change-over valve device 24, which forms a part of the control device 3, comprises a rotary valve 200 mounted in a bore in the casing section 202 and rotatable on a seat formed on the casing section 204. The rotary valve 200 has formed on the face opposite its seat an annular flange 206, as is best shown in Fig. 5 of the drawings, this flange having notches on opposite sides thereof adapted to receive the ends of the arms 208 and 209 which are formed integral with an operating shaft 210 which extends through a bore in the rotary valve 200 and a bore in the casing section 204.

The arms 208 and 209 are of unequal width and the notches in the flange 206 are also of unequal width so that the shaft 210 and the rotary valve 200 may be connected together in only one way.

A spring 212 is mounted in a bore in the shaft 210 and extends between the bottom of this bore and a thrust member 215 which is positioned in a bore in the casing section 202 and which has a rounded head which engages the casing section 202. The spring 212 operates to urge the shaft 210 to the right and thereby to press the rotary valve 200 into engagement with its seat.

Figure 6:
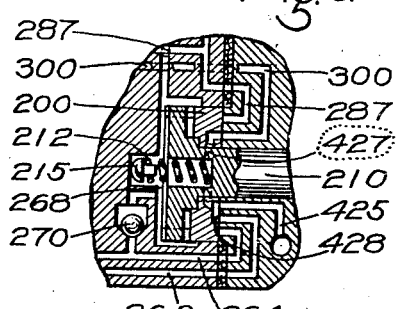
Fig. 6 is a sectional view of a portion of the changeover valve device employed in the equipment shown in Fig. 1, and showing the relationship of the parts of this device when the device is moved to the position to condition the equipment for empty operation.

Means is provided to effect movement of the rotary valve between the position in which the equipment is conditioned for loaded car operation, which is the position in which it is shown in Fig. 1 of the drawings, and the position in which the equipment is conditioned for empty car operation, which is the position in which the rotary valve is shown in Fig. 6 of the drawings. This means comprises a segment 220 journaled on a tubular extension 221 of the casing section 204 and secured to the end of the operating shaft 210 by means of pins 222 and 223 which are of unequal size so that the segment 220 and the shaft 210 may be secured together in only one way.

Figure 3:
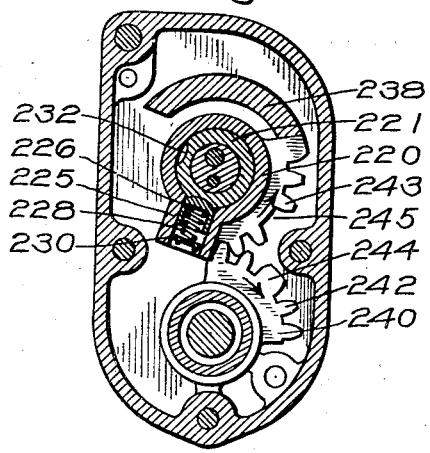
Fig. 3 is a sectional view taken substantially along the line 3—3 of Fig. 1.
Figure 4:
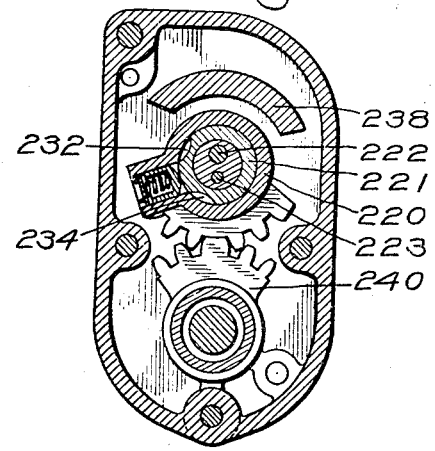
Fig. 4 is a sectional view similar to Fig. 3, but showing the parts in a different position than that in which they are shown in Fig. 3.

As best shown in Figs. 3 and 4 of the drawings the hub portion of the segment 220 has a projecting portion 225 formed thereon, this portion having a bore therein in which is mounted a plunger 226 which is urged radially inwardly by means of a spring 228 which presses against a plate 230 which may be secured in the bore in the portion 225 in any suitable manner. The inner end of the plunger 226 is rounded or curved as shown in the drawings, and is adapted to extend into the recesses 232 and 234 which are cut into the face of the projecting portion 221 so as to resist movement of the segment 220 and thereby of the operating shaft 210 and the rotary valve 200 away from the positions determined by these notches.

The casing section 236 has an arcuate projecting portion 238 formed integral therewith, one end of which is adapted to be engaged by a portion of the segment 220 to limit movement of this segment in a counterclockwise direction as viewed in Fig. 3 of the drawings. When the segment 220 is moved to this position, which is the position in which it is located when the apparatus is conditioned for load operation, the plunger 226 is forced into the depression 234 by the spring 228 so as to maintain the segment in this position.

After a predetermined amount of rotation of the segment 220 in a clockwise direction from the position in which it is shown in Fig. 3 of the drawings, the projecting portion 225 will engage the other end of the portion 238 to prevent further rotation of the segment 220 in this direction, while the plunger 226 will be forced into the recess 232 by the spring 228 so as to maintain the rotary valve 200 in this position, in which position the apparatus is conditioned for empty car operation. The portion 238, therefore, serves to limit the range of movement of the segment 220, while the notches 232 and 234 serve to define the operative positions of the member 220 and to prevent the unintended movement of the segment from either of these positions towards the other of these positions. As will be understood, when the segment 220 is moved from either position the plunger 226 is forced outwardly against the spring 228 and presses against the face of the section 221 intermediate the notches 232 and 234.

Manually operated means is provided for effecting movement of the segment 220 between its operating positions, and this means comprises a segment 240 having a hub portion 241 formed integral therewith, one end thereof being supported in a bore in the casing section 204, and the other end being supported in a bore in the casing section 236. The segment 240 is provided with teeth indicated at 242 which are adapted to mesh with similar teeth 243 formed on the segment 220. The segment 240 is provided with one tooth, indicated at 244, which is of substantially greater width than the other teeth and it is adapted to be received by a recess, indicated at 245, between adjacent teeth on the segment 220 so that the segments 220 and 240 may be assembled together only in a predetermined relationship.

Figure 7:
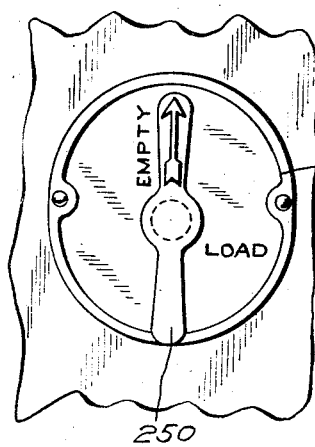
Fig. 7 is an elevational view of a portion of the changeover valve mechanism employed in the equipment shown in Fig. 1.

The hub 241 is adapted to receive a shaft 247 and to be secured thereto in any suitable manner, such as by rivets 248 extending through the shaft and the hub portion 241. The shaft 247 preferably extends transversely of the car on which this brake equipment is mounted and has its ends located on opposite sides of the car. Each end of the shaft 247 is provided with an operating handle 250, by means of which the shaft 247 may be rotated, while a plate 251 may be secured to the car structure surrounding the shaft 247, this plate having indicating indicia thereon, as best shown in Fig. 7, to indicate when the handle is in the position to condition the equipment for empty car operation and when it is in the position to condition the apparatus for loaded car operation. As will be understood when the handle 250 is rotated the shaft 247 will turn and will cause the segment 240 to turn and its movement will be transmitted through the teeth thereon to the segment 220 which effects rotation of the rotary valve 200 on its seat.

The change-over valve device 24 has a passage 260 formed therein and communicating with a pipe 261 which leads to the load reservoir and with a port in the seat of the rotary valve 200. The change-over valve device also has a passage 264 formed therein, which communicates with the pipe 161, which leads from the brake controlling valve device 1, and with a port in the seat of the rotary valve 200. The passage 264 has a branch passage 266 leading therefrom and communicating with the chamber 268 on the exposed face of the rotary valve 200. Communication through the passage 266 is controlled by means of a ball check valve 270 which operates to permit fluid to flow from the passage 264 to the chamber 268, and to cut off communication from the chamber 268 to the passage 264.

The change-over valve device also has a passage 275 formed therein which communicates with the pipe 198, which leads from the brake controlling valve device 1, and with the chamber 277 on one side of an air straining unit 278, which may be of any suitable construction, and which, as shown, comprises a quantity of curled hair 279 positioned between a pair of perforated discs 281 and 282, which are held together by means of a rivet 283. The chamber 285 on the other side of the air straining unit 278 is connected by way of the passage 287 with a port in the seat of the rotary valve 200, and by way of the passage 290 with a valve chamber 291 which communicates by way of a passage 293 with the chamber 268 on the exposed face of the rotary valve 200.

The valve chamber 291 has mounted therein a valve element 295 which is urged into engagement with a seat rib 296 by means of a spring 297, while the chamber within the seat rib 296 has a ball check valve element 298 positioned therein. The valve 295 and the ball check valve 298 operate to permit fluid to flow from the passage 287 to the valve chamber 291 and therefrom to the chamber 268, and to cut off the flow of fluid from the chamber 268 and the valve chamber 291 to the passage 287.

The change-over valve device 24 also has a passage 300 formed therein which communicates with a port in the seat of the rotary valve 200 and with a chamber 302 in the transfer valve device 26.

The transfer valve device 26 comprises a movable abutment in the form of a diaphragm 305 which is clamped between the casing section 307 and the casing section 308, and which has secured thereto a stem 309 which operates a slide valve 310 positioned in the chamber 302 on one side of the diaphragm 305.

The diaphragm 305 has on the other side thereof a chamber 312 in which is mounted a plunger 315 which extends into a bore in the end 314 of the stem 309 and which engages a face of a diaphragm 317 which is clamped between the casing section 307 and a casing section 319.

One face of the diaphragm 317 is subject to the pressure of the fluid in the chamber 312 and the other face is subject to the pressure of the plunger 320 which is mounted in a chamber 321, which is constantly connected to the atmosphere by way of a passage 322.

The plunger 320 is urged to the right as viewed in Fig. 1 of the drawings by means of a spring 325 acting through the spring seat 327. A locking ring 329 is provided and is fitted in a groove in the casing section 319 and is engaged by the periphery of the spring seat 327 to limit movement of the spring seat to the right as viewed in the drawings, and thereby to limit the range of movement of the spring seat 327 and of the diaphragm 317 by means of the plunger 320.

The transfer valve device 26 has a passage 330 formed therein which communicates with a port in the seat of the slide valve 310 and with the chamber 312. The transfer valve device also has a passage 331 formed therein which communicates with the passage 330 and with a port in the seat of the slide valve 310. This passage has a ball check valve 333 interposed therein which is operative to permit fluid to flow from the passage 330 to the chamber 302 through the passage 331, and to cut off communication through the passage 331 in the opposite direction.

The relay valve device 28 comprises a body having a bore therein in which is mounted a piston 335 having on one side thereof a chamber 337 which is in communication with the chamber 312 of the transfer valve device 26 by way of the passage 330.

The piston 335 has on the opposite side thereof a valve chamber 338 in which is mounted a slide valve 339 which is adapted to be operated by means of the piston stem 340.

The body of the relay valve device 28 has a passage 342 formed therein which communicates with an atmospheric exhaust passage 343 and with ports in the seat of the slide valve 339.

The body of the relay valve device 28, in addition, has formed therein a valve chamber 345 in which is mounted a valve 346 and which is urged into engagement with a seat rib 348 by means of a spring 349. The valve 346 has associated therewith a fluted stem 350 which is mounted in a bore in the body of the valve device 28, and which communicates with the chamber 345 and with the slide valve chamber 338, while the end of the stem 350 is adapted to be engaged by the end of the piston stem 340.

The valve chamber 345 communicates with the load reservoir 261 through a restricted passage 353 and a passage 354 to which is connected the pipe 261. The slide valve chamber 338 is connected to the load brake cylinder 6 by way of the passage and pipe 355.

The empty brake cylinder 4 is provided with a piston 360 having associated therewith a push rod 361 which is connected to the brake lever 362, which lever controls the application and release of the brake.

The load brake cylinder 6 is provided with a piston 370 having a hollow stem 371 associated therewith and surrounded by a spring 372 which operates to urge the piston 370 to move to the position in which it is shown in the drawings. A push rod 375 is positioned within the hollow stem 371 and is provided with a series of teeth 376.

A latch mechanism, indicated generally by the reference numeral 380, is mounted on the exposed end of the hollow stem 371, and, as shown, comprises a pivoted lock lever 381, which in the release position of the piston 370 is held out of engagement with the teeth 376 by means of a pin 383, which engages the outer end of the brake cylinder 6, and which presses against the end of the lever 381. The lock lever 381 is urged into engagement with the teeth 376 by means of a spring 385 acting through a plunger 387.

The end of the push rod 375 is pivotally secured to a lever 390 which is pivotally secured adjacent one end to a portion of the car structure indicated at 391, and which has pivotally secured thereto intermediate its ends, at a point indicated at 392, a link 394 which has its other end pivotally connected to the end of the push rod 361 of the empty brake cylinder 4 and thereby to the brake lever 362.

A return spring 395 is connected to the brake lever 362 and operates to urge the lever 362 to the release position.

In the operation of the equipment, assuming that the changeover valve device 24 is in the position to condition the equipment for load operation, which is the position in which it is shown in Fig. 1 of the drawings, that the brake cylinders 4 and 6 are at atmospheric pressure, and that the other elements of the equipment are in the position in which they are shown in Figs. 1 and 2 of the drawings, if fluid under pressure is supplied to the brake pipe 30 it will flow from this pipe by way of the branch pipe 31 to the passage 32 and to the chamber 42, and through the air straining unit 43 to the chamber 44 and therefrom to the chamber 45 on the face of the piston 48 of the service portion 16.

Fluid which is supplied to the chamber 45 flows therefrom by way of the feed groove 400 to the valve chamber 49 and from this chamber by way of the passage 35 to the pipe 33 which leads to the auxiliary reservoir 8 thereby charging this reservoir with fluid under pressure. Fluid which is supplied to the valve chamber 49 also flows through a port 401 in the slide valve 52 which, in the release position of the piston 48, is in communication with the port which is associated with the passage 38 which leads to the pipe 36 to which is connected the emergency reservoir 9, thereby charging the emergency reservoir with fluid under pressure from the valve chamber 49.

Fluid which is supplied to the chamber 44 within the air straining unit 43 flows therefrom by way of the passage 65 to the chamber 62 on the right hand side of the piston 60 of the emergency section 17. Fluid which is supplied to the chamber 62 flows therefrom by way of the port 68 and the passage 64 to the chamber 66 on the opposite face of the piston 60 and to the chamber 63.

In the release position of the piston 48 a port 403 through the slide valve 52 is in alignment with the port communicating with the passage 154 so that fluid under pressure from the valve chamber 49 flows through the port 403 to the passage 154 and thereby to the chamber 152 on the lower face of the diaphragm 150, and on an increase in the pressure of the fluid in this chamber the diaphragm 150 is pressed upwardly so that the plate 174 engages the end of the stem 172 of the valve 167 and forces this valve upwardly away from its seat against the spring 169.

Fluid which is supplied from the brake pipe to the chamber 45 flows from this chamber by way of the passage 187 past the ball check valve 185 to the chamber 182, and on an increase in the pressure of the fluid in this chamber the valve 177 is moved away from the seat rib 180 against the spring 179 so that fluid under pressure from the chamber 182 flows to the chamber 175. Fluid which is supplied to the chamber 175 flows by way of a passage 176 to the chamber 165, and therefrom past the open valve 167 to the chamber 156 and from this chamber through the choke 158 to the passage 160 which communicates with the pipe 161.

Fluid which is supplied to the pipe 161 flows therefrom to the passage 264 in the change-over valve portion 24 and to a port in the seat of the rotary valve 200, and in the load position of the rotary valve 200, a cavity 410 establishes communication between the passage 264 and the passage 260 so that fluid flows from the passage 264 to the passage 260 and therefrom to the pipe 261 which leads to the load reservoir 10 so that the load reservoir will be charged with fluid under pressure. Fluid which is supplied to the passage 260 also flows by way of the passage 354 and through the choke 353 to the valve chamber 345 charging this chamber with fluid under pressure.

When the pressure of the fluid in the load reservoir 6 increases to a value substantially equal to that in the brake pipe, there will be a similar increase in the pressure of the fluid in the chamber 156 and the diaphragm 150 will thereupon be moved downwardly against the fluid in the chamber 152 on the opposite side of the diaphragm, with the result that the follower plate 174 will move away from the end of the stem 172, thereby permitting the valve 167 to be moved by the spring 169 to the seated position.

Fluid which is supplied to the passage 264 also flows by way of the passage 266 past the check valve 270 to the chamber 268, charging this chamber with fluid under pressure so as to maintain the rotary valve 200 in engagement with its seat. Fluid from the chamber 268 also flows by way of the passage 293 to the valve chamber 291, but fluid cannot flow from this chamber to the passage 287 as the flow of fluid in this direction is cut off by the valve 295 and the ball check valve 298.

In the release position of the piston 48 of the service portion 16 the empty brake cylinder 4 is vented to the atmosphere by way of the pipe 39, the passage 40, the chamber 190, the restricted passage 192, the passage 194, the passage 110, chamber 85, passage 81, valve chamber 75, the passage 76, and a cavity 415 in the slide valve 52 which establishes communication between the passage 76 and an atmospheric exhaust passage 417.

The pipe 198 and the connecting passages which communicate with the chamber 302 of the transfer valve device 24 will also be vented to the atmosphere by way of the passage 110, the chamber 85, the passage 81, valve chamber 75, and the passage 76 which is connected to the atmospheric exhaust passage 417.

If, after the equipment is charged with fluid under pressure, fluid is vented from the brake pipe 30 at a service rate fluid will also be vented from the chamber 45 of the service portion 16 and the piston 48 will be moved to the left by the pressure of the fluid in the valve chamber 49 on the opposite side of the piston. On movement of the piston 48 the feed groove 400 will be closed and the stem 56 will cause the auxiliary valve 53 to be moved to uncover the service port 418, and on further movement of the piston 48 the main slide valve 52 will be moved to the left so that the service port 418 will register with the passage 76, while the cavity 415 will be moved out of registry with the passage 76. Fluid under pressure thereupon will be supplied from the auxiliary reservoir 8 to the passage 76 by way of the pipe 33, the passage 35, the valve chamber 49, and the service port 418 in the main slide valve 52.

On a reduction in the pressure of the fluid in the brake pipe 30 at a service rate, the piston 60 of the emergency section 17 moves to a position to cut off communication between the chamber 62 and the port 68 and to move the auxiliary valve 69 to a position in which the port 430 therein establishes communication with a port 431 through the main slide valve 67 which communicates with an atmospheric exhaust port 432, so that fluid will be vented from the valve chamber 66 and the pressure chamber 63 to reduce the pressure of the fluid in these chambers at a rate substantially equal to the rate at which the pressure of the fluid in the brake pipe is reduced.

Fluid which is supplied to the passage 76 flows therefrom to the valve chamber 75, past the open valve 78, through the passage 81 to the chamber 85, and therefrom by way of the passage 110 to the passage 194 and to the pipe 198.

Fluid which is supplied to the passage 194 flows therefrom past the check valve 196, and also through the restricted passage 192, to the chamber 190. Fluid which is supplied to the chamber 190 flows therefrom by way of the passage 40 to the pipe 39 and through this pipe to the empty brake cylinder 4.

The rate of flow of fluid to the empty brake cylinder 4 is not restricted by the choke 192 as fluid may flow to the brake cylinder past the check valve 196, thus permitting the empty brake cylinder to be charged at a rapid rate.

On an increase in the pressure of the fluid supplied to the empty brake cylinder 4 the piston 360 will be moved to the right, and will act through the push rod 361 to operate the brake lever 362 to take up the slack in the brake rigging and to press the brake shoes against the wheels. Movement of the push rod 361 will be transmitted through the link 394 to the pivotal connection 392, and will cause the lever 390 to rotate about the support 391 and thus cause the push rod 375 to be moved to the right as viewed in the drawings relative to the stem 371 of the piston 370 of the load brake cylinder 6.

The push rod 375 may move freely at this time as the lock lever 381 of the latch mechanism 380 is released due to the engagement of the pin 383 with the end of the brake cylinder 6.

During this movement of the push rod 375 the piston 370 will be held by the spring 372 in the position in which it is shown in the drawings.

Fluid which is supplied to the passage 110 in the brake controlling valve device 1, from which fluid is supplied to the empty brake cylinder 4, flows also to the pipe 198, and thereby to the passage 275 in the change-over valve device 24, through the air strainer 278 to the passage 287, and therefrom by way of a cavity 420 in the rotary valve 200 to the passage 300, and through this passage to the chamber 302 of the transfer valve device 26.

Fluid which is supplied to the passage 287 flows from this passage by way of the passage 290 past the ball check valve 296 to the chamber in which the ball valve 298 is mounted, and it will unseat the valve 295, if the pressure of the fluid supplied to the passage 287 exceeds that in the valve chamber 291, so that fluid will flow to the chamber 291 and to the chamber 268 to hold the rotary valve 200 against its seat, if it is not already held by fluid in thhe chamber 268 supplied therefrom the passage 264.

On a slight increase in the pressure of the fluid in the chamber 302 of the transfer valve device 26 the diaphragm 305 will be caused to flex to move the stem 309 to the left, as viewed in the drawings, until the end portion 314 engages the head of the stem 315, whereupon further movement of the diaphragm 305 will be resisted by the spring 325 acting through the spring seat 327 and the plunger 320.

When the stem 309 is moved to the position in which its movement is resisted by the spring 325, the slide valve 310 is still in a position to cut off the flow of fluid from the chamber 302 to the passage 330.

On a further increase in the pressure of the fluid in the chamber 302, which pressure is substantially the same as that supplied to the empty brake cylinder 4, the diaphragm 305 will be moved against the spring 325, and the slide valve 310 will uncover the passage 330 so that fluid may flow from the chamber 302 to the passage 330 and therethrough to the chamber 312 on the opposite side of the diaphragm 305, and also to the chamber 337 on one side of the piston 335 of the relay valve device 28.

The transfer valve device 26 first operates to supply fluid under pressure to passage 330, upon an increase in the pressure of fluid supplied to the empty brake cylinder and thus to chamber 302, to a degree sufficient to overcome the opposing force of the spring 325, and the fluid pressure is then built up in passage 330 and in chamber 312 to a degree such that pressure increase acting in chamber 312 on diaphragm 305 plus the force exerted by the spring 325 over the opposing pressure acting on diaphragm 317 will be sufficient to overcome the pressure of fluid in chamber 302 acting on the diaphragm 305, so as to move the valve 310 to cut off further flow to passage 330.

Thus the pressure of fluid supplied to passage 330 will be a degree less than the pressure of fluid supplied to chamber 302, but this differential of pressures is reduced as the pressure in chamber 302 is increased, since the increase in pressure thus produced in chamber 312 acts on diaphragm 317 to correspondingly reduce the effective force of spring 325, until finally, the force of the spring 325 is balanced by the opposing force of the fluid pressure acting on the diaphragm 317, so that the movement of the diaphragm 305 and the valve 310 to open position being unopposed, the pressure of fluid in the chamber 302 and thus the pressure of fluid supplied to the empty brake cylinder, is permitted to fully equalize into the passage 330.

In the preferred embodiment the various parts of the equipment are proportioned so that the force exerted by the fluid in the chamber 312 and acting on the diaphragm 317 in opposition to the spring 325 will overcome the spring 325 when the pressure of the fluid in this chamber has increased to a value substantially equal to that present in the empty brake cylinder on equalization of the auxiliary reservoir with the empty brake cylinder.

Fluid which is supplied to the passage 330, leading to the chamber 312, will also flow by way of the passage 339 to the chamber 337 of the relay valve device 28 and the fluid in this chamber acting on the piston 335 causes the piston to move to the left as viewed in the drawings, thereby moving the slide valve 339 to a position to cut off communication between the valve chamber 338 and the passage 342 and therefrom to the atmosphere. On further movement of the piston 335 the end of the piston stem 340 engages the end of the stem 350 of the valve 346 and moves this valve against the spring 349 away from the seat rib 348, thereby permitting fluid to flow from the load reservoir 10 by way of the pipe 261 to the passage 354, and through the restricted passage 353 to the valve chamber 345, and therefrom to the chamber 338 and by way of the passage and pipe 355 to the load brake cylinder 6.

Fluid will continue to be supplied to the load brake cylinder 6 until the pressure of the fluid in this cylinder, and in the valve chamber 338, has increased to a value substantially equal to the pressure of the fluid in the chamber 337 on the opposite side of the piston 335, whereupon the piston 335 will be moved to the lap position, in which position the end of the stem 340 is moved out of engagement with the end of the stem 350 of the valve 346, thus permitting the valve 346 to move into engagement with the seat rib 348 to cut off further flow of fluid from the load reservoir to the valve chamber 338 and to the load brake cylinder 6, while the slide valve 339 is maintained in a position to cut off the release of fluid from the valve chamber 338 to the atmosphere by way of the passage 342.

As the pressure of the fluid in the chamber 337 is controlled by the transfer valve device 26 in accordance with variations in the pressure of the fluid supplied to the empty brake cylinder, the relay valve device 28 will operate to control the supply of fluid to the brake cylinder in accordance with variations in the pressure of the fluid supplied to the empty brake cylinder.

It will be seen, therefore, that the transfer valve device 26 operates to cut off the flow of fluid to the relay valve 28, and thereby to prevent the flow of fluid to the load brake cylinder 6, until the pressure of the fluid in the empty brake cylinder 4 has increased to a predetermined value, and that thereafter fluid is supplied to the load brake cylinder at a rate which is determined by the rate of increase in the pressure of the fluid supplied to the empty brake cylinder, but is such that the rate of increase in the pressure of the fluid in the load brake cylinder is somewhat more rapid than the rate of increase in the pressure of the fluid supplied to the empty brake cylinder. The rate of build-up of the pressure of the fluid supplied to the load brake cylinder will be uniform, however, from the time at which the supply of fluid thereto is initiated, with the result that there will be no sudden change in the braking force exerted by the brake equipment on the car due to changes in the rate of flow of fluid to the brake cylinders.

The fluid under pressure which is supplied to the load brake cylinder 6 operates to move the piston 370 to the right against the spring 372, thereby moving the hollow piston stem 371 and the latch mechanism 380 which is carried thereby. On movement of the latch mechanism 380 the lock lever 381 is released by the pin 383 which moves away from the end of the brake cylinder 6, and the spring 385, acting through the plunger 387, forces the lock lever 381 into engagement with a tooth 376 on the push rod 375, and on further movement of the piston 370 as a result of the increase in the pressure of the fluid supplied to the load brake cylinder 6, the piston 370 acting through the hollow piston stem 371 and the latch mechanism 380 urges the push rod 375 to the right, and its movement is transmitted through the lever 390 and the link 394 to the brake lever 362 to increase the degree of application of the brakes.

When the piston 48 of the service portion 16 of the brake controlling valve device 1 moves to the application position the cavity 415 in the slide valve 52 establishes communication between the port associated with the passage 154 and the port associated with the exhaust passage 417 so that the fluid in the chamber 152 is released to the atmosphere, thereby insuring that the diaphragm 150 will be held in the position in which it is shown in the drawings, and insuring that the valve 167 will be moved to its seat by the spring 169, thus preventing the supply of fluid from the brake pipe 30 to the load reservoir 10.

It will be seen that the flow of fluid from the load reservoir 10 to the brake pipe is cut off by means of the valve 167 and the ball check valve 185.

Upon an increase in the pressure of the fluid in the brake pipe 30 to effect a release of the brakes, the pressure of the fluid in the chamber 45 will be increased, and the piston 48 will again return to the position in which it is shown in the drawings, in which position the slide valve 52 is moved to the position in which the cavity 415 establishes communication between the passage 76 and the passage 417, and in which the port 403 through the slide valve 52 again establishes communication with the port associated with the passage 154.

On movement of the piston 48 to the position in which it is shown in the drawings the feed groove 400 is again opened to permit fluid supplied from the brake pipe to the chamber 45 to flow therefrom to the valve chamber 49, from which fluid flows by way of the passage 35 to the auxiliary reservoir 8, and also by way of the passage 154 to the chamber 152 to again move the valve 167 away from its seat so as to permit fluid to flow from the brake pipe to the load reservoir 10 as soon as the pressure of the fluid in the brake pipe is increased to a value above that present in the load reservoir.

On the release of fluid from the passage 76 fluid is released from the empty brake cylinder 4 by way of the pipe 39, the passage 40, the restricted passage 192, the passage 194, the passage 110, the chamber 85, the passage 81, and the valve chamber 75. It will be seen that the rate at which fluid is released from the empty brake cylinder is regulated by means of the choke 192, the ball check valve 196 being operative to prevent the flow of fluid from the brake cylinder to the atmosphere through the passage controlled by this check valve.

On the release of fluid from the passage 76 fluid will also be released from the chamber 302 of the transfer valve device 26 by way of the passage 300, the cavity 420 in the rotary valve 200, the passage 287, through the strainer 278, to the passage 275 and to the pipe 198, from which fluid flows to the passage 110 and therefrom to the chamber 85 and to the valve chamber 75 from which it is released to the atmosphere by way of the passage 76 and the passage 417.

Upon the release of fluid from the chamber 302 the diaphragm 305 will be moved to the position in which it is shown in the drawings by the pressure of the fluid in the chamber 312, and thereafter fluid from the chamber 312 will flow to the chamber 302 by way of the passage 331 past the ball check valve 333. Fluid from the chamber 337 of the relay valve device 28 will also flow to the chamber 302 by way of the passage 330 and the passage 331 past the check valve 333.

It will be seen, therefore, that on the release of fluid from the chamber 302 fluid will also be released from the chamber 337 of the relay valve device 28, and on a reduction in the pressure of the fluid in the chamber 337 the piston 335 will be moved by the fluid under pressure in the chamber 338, so that the slide valve 339 will be moved to the position in which it is shown in the drawings, in which position the ports in the slide valve establish communication with the ports associated with the passage 342, thus permitting fluid to escape from the chamber 338 to the atmosphere.

The rate of reduction in the pressure of the fluid in the load brake cylinder 6 will be determined by the rate at which fluid is released from the chamber 302 of the transfer valve device 26, and it will be seen that fluid will be released from this chamber more rapidly than fluid is released from the empty brake cylinder 4, as fluid is released from this chamber at an unrestricted rate through the pipe 198, while fluid is released from the empty brake cylinder through the restricted passage 192. The pressure of the fluid in the load brake cylinder, therefore, will be reduced more rapidly than the pressure of the fluid in the empty brake cylinder is reduced.

As the pressure of the fluid in the load brake cylinder is reduced the piston 370 will be moved by the spring 372 to the left, and will move the hollow piston stem 371 and the latch mechanism 380 relative to the push rod 375, the lock lever 381 being operative to permit the piston stem to move relative to the push rod in this direction.

When the piston 370 moves to the position in which it is shown in the drawings, the pin 383 engages the end of the cylinder 6 and moves the lock lever 381 to the release position.

During this movement of the piston 370 of the load brake cylinder 6 the push rod 375 is held substantially in the application position by the piston 360 of the empty brake cylinder 4 which is subject to the slowly reducing pressure in the empty brake cylinder.

After a time interval the pressure of the fluid in the empty brake cylinder 4 is reduced to a relatively low value and the piston 360 is moved to the release position by the spring 395 acting through the lever 362 and the push rod 361. In addition the push rod 375 will be moved to the position in which it is shown in the drawings by the spring 395 acting through the lever 362 and the lever 390. The push rod 375 may be moved relative to the latch mechanism and the hollow piston stem 371 at this time as the lock lever 381 is held in the release position by the pin 383.

As the fluid in the load brake cylinder is released more rapidly than the fluid in the empty brake cylinder is released, the piston of the load brake cylinder will be moved to the release position so as to effect the release of the latch mechanism before the piston of the empty brake cylinder moves to the release position. This insures that the piston of the load brake cylinder will be moved to the position to release the latch mechanism before any force is exerted on the push rod 375 tending to move it relative to the piston 370 of the load brake cylinder, thus eliminating the possibility of damage to the latch mechanism or to the teeth 376 which are cut on the push rod 375.

When it is desired to condition this apparatus for empty car operation the operating handle 250 is turned from the empty position to the load position, and this movement of the handle 250 causes rotation of the shaft 247 which is transmitted to the segment 240 and causes rotation of the segment 220, which in turn causes rotation of the rotary valve 200 from the position in which it is shown in Fig. 1 of the drawings, to the position in which it is shown in Fig. 6 of the drawings.

When the rotary valve 200 is moved to the position in which it is shown in Fig. 6 of the drawings communication between the passage 287 and the passage 300 is cut off, while a port 427 in the rotary valve establishes communication between the passage 300 and an atmospheric exhaust passage 425.

In addition, when the rotary valve 200 is turned to the position in which it is shown in Fig. 6 of the drawings, communication is cut off between the passage 264 and the passage 260, so as to cut off the supply of fluid to the load reservoir, while the passage 260, which is connected to the load reservoir, is connected to the atmospheric exhaust passage port 425 by means of a port 428 in the rotary valve 200.

As communication is cut off between the passage 287 and the passage 300 fluid will not be supplied to the transfer valve device to operate this device, while the chamber 302 will be maintained at atmospheric pressure. In addition, it will be seen that when the apparatus is conditioned for empty car operation the passage leading to the load reservoir is cut off, so that fluid under pressure will not be supplied to this reservoir, while the reservoir is maintained at atmospheric pressure.

It will be seen, however, that fluid which is supplied from the brake controlling valve device 1 by way of the pipe 161 to the passage 264 in the change-over valve device 24, will flow by way of the passage 266, past the ball check valve 270, to the chamber 268 on the exposed side of the rotary valve 200 to maintain this valve in engagement with its seat. Also on the supply of fluid to the empty brake cylinder 4 fluid will be supplied to the pipe 198, and therefrom by way of the passage 275 to the passage 287 from which fluid will flow past the ball check valve 298 and the valve 295 to the chamber 268 on the exposed side of the rotary valve to maintain this valve in engagement with its seat.

Figure 8:
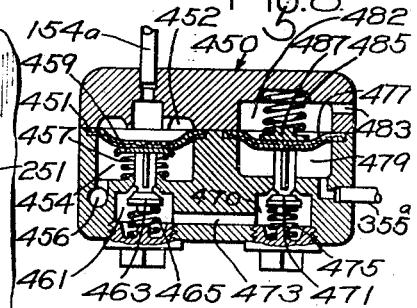
Fig. 8 is a sectional view showing a valve device which we may employ to control the release of fluid from the load brake cylinder.

In Fig. 8 of the drawings there is illustrated a valve device which we may employ in modified form of the system provided by this invention to control the release of fluid from the load brake cylinder so as to insure that the fluid in the load brake cylinder will be reduced to atmospheric pressure before the empty brake cylinder is reduced to atmospheric pressure.

This valve device, indicated generally at 450, comprises a movable abutment in the form of a diaphragm 451 having on one side thereof a chamber 452 which is connected by way of a pipe 154a to the passage 154 in the body of the service portion 16 of the brake controlling valve device 1. The diaphragm 451 has at the other side thereof a chamber 454 which is constantly connected to the atmosphere by way of a passage 456. A spring 457 is mounted in the chamber 454 and extends between a wall of the chamber and a follower plate 459 which engages the face of the diaphragm 451.

The body of the valve device also has a valve chamber 461 formed therein in which is mounted a valve 463, which has a fluted stem which is engaged by the follower plate 459, the valve being urged by a spring 465 into engagement with a seat surrounding the passage in which it is mounted.

In addition the body of the valve device has formed therein a valve chamber 470 in which is mounted a valve 471, and which is connected with the valve chamber 461 by way of a passage 473. The valve 471 is urged into engagement with its seat by means of a spring 475 and has a fluted stem which is engaged by a movable abutment in the form of a diaphragm 477 which has at one side thereof a chamber 479 which is connected by way of a pipe 355a with the load brake cylinder 6.

The diaphragm 477 has at the other side thereof a chamber 482 which is constantly connected to the atmosphere by way of a passage 483, while a spring 485 is mounted in the chamber 482 and engages a follower plate 487 which engages the face of the diaphragm 477. The spring 485 moves the diaphragm 477 downwardly, as viewed in the drawings, so as to move the valve 471 against the spring 475, the spring 485 being proportioned so as to overcome the spring 475.

In the braking system in which the valve device 450 is employed the choke 192, which restricts the rate of flow of fluid from the empty brake cylinder during a release of the brakes, is omitted, while the check valve 196 may also be omitted so that fluid under pressure may flow from the empty brake cylinder at an unrestricted rate during a release of the brakes.

In the operation of this embodiment of our invention, when the piston 48 of the service portion 16 of the brake controlling valve device 1 is in the release position, fluid under pressure is supplied from the auxiliary reservoir 8 by way of the passage 154 in the service portion 16, and the pipe 154a, to the chamber 452, and on an increase in the pressure of the fluid in this chamber, the diaphragm 451 is moved downwardly against the spring 457 so as to move the valve 463 away from its seat against the spring 465, thus establishing communication between the chamber 461 and the chamber 454, and therefrom to the atmosphere by way of the passage 456.

At the same time, assuming that the load brake cylinder is at atmospheric pressure, the diaphragm 477 is forced downwardly by the spring 485 which acts through the follower 487 and moves the valve 471 against the spring 475 and away from its seat so as to establish communication between the chamber 479 and the chamber 470. The load brake cylinder therefore will be connected to the atmosphere by way of the pipe 355a, the chamber 479, the valve chamber 470, the passage 473, the chamber 461, the chamber 454, and the atmospheric passage 456.

On a reduction in the pressure of the fluid in the brake pipe, the service portion 16 of the brake controlling valve device 1 operates as described above to supply fluid under pressure to the empty brake cylinder, and, assuming that the change-over valve device is in a position to condition the apparatus for loaded car operation, fluid under pressure is also supplied to the transfer valve device 26. This valve device thereupon operates as described in detail above to supply fluid under pressure to the relay valve device 28, which then operates to supply fluid from the load reservoir 10 to the load brake cylinder 6.

On movement of the piston 48 of the service portion 16 to the application position the main slide valve 52 is moved to a position to cut off communication between the auxiliary reservoir and the passage 154, and to establish communication between the passage 154 and the atmosphere, with the result that fluid under pressure in the chamber 452 will be released to the atmosphere by way of the passage 154a and the passage 154 in the brake controlling valve device. On a reduction in the pressure of the fluid in the chamber 452 the diaphragm 451 will be moved by the spring 457 away from the end of the valve 463, and this valve will thereupon be moved to the seated position by the spring 465, thereby cutting off communication between the load brake cylinder and the atmospheric exhaust passage 456.

Fluid which is supplied to the load brake cylinder 6 flows by way of the pipe 355a to the chamber 479, and on an increase in the pressure of the fluid in this chamber to a predetermined value, the diaphragm 477 is moved against the spring 485 away from the end of the stem of the valve 471, whereupon the valve 471 is moved to the seated position by the spring 475, thereby cutting off communication between the chamber 479 and the chamber 470.

On an increase in the pressure of the fluid in the brake pipe to effect a release of the brakes the piston 48 of the brake controlling valve device moves to the release position, in which position fluid is released from the empty brake cylinder and also from the chamber 302 of the transfer valve device 26, which thereupon operates to release fluid from the chamber 337 of the relay valve device 28, which causes this valve device to operate to release fluid from the load brake cylinder 6.

In addition, on movement of the piston 48 of the service portion of the brake controlling valve device to the release position the slide valve 52 is moved to a position to again establish communication between the auxiliary reservoir and the passage 154 so that fluid under pressure will be supplied to the passage 154, and to the pipe 154a which leads to the chamber 452 in the valve device 450. On an increase in the pressure of the fluid in the chamber 452 the diaphragm 451 is moved downwardly against the spring 457 and engages the end of the stem of the valve 463 and moves this valve against the spring 465 away from its seat so as to establish communication between the chamber 461 and the chamber 454. However, as the valve 471 is in the seated position, fluid under pressure from the load brake cylinder will not be released to the atmosphere on movement of the valve 463 away from its seat.

The transfer valve device 26 operates to control the release of fluid from the load brake cylinder 6 in accordance with the rate of reduction in the pressure of the fluid in the empty brake cylinder 4, and when the pressure of the fluid in the load brake cylinder 6 is reduced to a predetermined value the force exerted by the fluid under pressure in the chamber 479, which is at substantially the same pressure as the fluid in the load brake cylinder 6, will be insufficient to hold the diaphragm 477 against the spring 485, and this diaphragm will be moved downwardly by the spring 485 and will engage the end of the stem of the valve 471 and move this valve against the spring 475 away from its seat. Fluid from the load brake cylinder may then flow by way of the pipe 355a to the chamber 479, and therefrom to the chamber 470, and by way of the passage 473 to the chamber 461, past the open valve 463 to the chamber 454, which is connected to the atmosphere by way of the passage 456. This effects a rapid reduction in the pressure of the fluid in the load brake cylinder so as to reduce the load brake cylinder to atmospheric pressure in advance of the empty brake cylinder.

From the foregoing it will be seen that the brake equipment provided by this invention is operative when the equipment is conditioned for load braking to cut off the supply of fluid to the load brake cylinder until a predetermined pressure is established in the empty brake cylinder, which pressure is sufficient to take up the slack in the brake rigging and to press the brake shoes against the wheels.

It will be seen also that the equipment has means to insure that during the release of the brakes, fluid will be released more rapidly from the load brake cylinder than it is released from the empty brake cylinder, whereby the possibility of damage to the latch mechanism associated with the load brake cylinder is eliminated.

In addition it will be seen that the equipment provided by this invention includes means to charge the load reservoir directly from the brake pipe, the charging of this reservoir being controlled so that it will be charged only when the brake controlling valve device is in the release position, and so that the charging of the load brake cylinder does not affect in any way the normal functions or the normal operation of the brake controlling valve device.

While a preferred embodiment and a modified form of the improved empty and load brake equipment provided by this invention have been illustrated and described in detail, it should be understood that the invention is not limited to these details of construction, and that numerous modifications and changes may be made without departing from the scope of the following claims.

Having now described our invention, what we claim as new and desire to secure by Letters Patent, is:

1. In an empty and load brake equipment, in combination, a brake pipe, an auxiliary reservoir, a load reservoir, valve means operative by an increase in the pressure of the fluid supplied thereto for supplying fluid under pressure from the brake pipe to the load reservoir, and a valve device operated by an increase in the pressure of the fluid in the brake pipe to supply fluid under pressure from the brake pipe to the auxiliary reservoir and to supply fluid under pressure to the said valve means.

2. In an empty and load brake equipment, in combination, a brake pipe, an auxiliary reservoir, a load reservoir, valve means operated by an increase in the pressure of the fluid supplied thereto for supplying fluid under pressure from the brake pipe to the load reservoir at a restricted rate, and a valve device operated by an increase in the pressure of the fluid in the brake pipe to supply fluid under pressure from the brake pipe to the auxiliary reservoir and to supply fluid under pressure to the said valve means.

3. In an empty and load brake equipment, in combination, a brake pipe, an auxiliary reservoir, a load reservoir, valve means operated by an increase in the pressure of the fluid supplied thereto for supplying fluid under pressure from the brake pipe to the load reservoir, and a valve device subject to the opposing pressures of the fluid in the brake pipe and in the auxiliary reservoir and controlling the supply of fluid under pressure from the brake pipe to the auxiliary reservoir and also controlling the supply of fluid under pressure to the said valve means.

4. In an empty and load brake equipment, in combination, a brake pipe, an auxiliary reservoir, a load reservoir, valve means operated by an increase in the pressure of the fluid supplied thereto for supplying fluid under pressure from the brake pipe to the load reservoir at a restricted rate, and a valve device subject to the opposing pressures of the fluid in the brake pipe and in the auxiliary reservoir and controlling the supply of fluid under pressure from the brake pipe to the auxiliary reservoir and also controlling the supply of fluid under pressure to the said valve means.

5. In an empty and load brake equipment, in combination, a brake pipe, an auxiliary reservoir, a load reservoir, valve means operative by an increase in pressure of the fluid supplied thereto to open a passage through which fluid may be supplied from the brake pipe to the load reservoir, a valve device operated by an increase in the pressure of the fluid in the brake pipe to supply fluid under pressure from the brake pipe to the auxiliary reservoir and to supply fluid under pressure to the said valve means, and means to cut off the flow of fluid from the load reservoir to the brake pipe through said passage.

6. In an empty and load brake equipment, in combination, a brake pipe, a brake cylinder, an auxiliary reservoir, a load reservoir, valve means operated by an increase in the pressure of the fluid supplied thereto for supplying fluid under pressure from the brake pipe to the load reservoir, and a valve device controlling the supply of fluid from the brake pipe to the auxiliary reservoir, the supply of fluid from the auxiliary reservoir to the brake cylinder, and the release of fluid from the brake cylinder, said valve device also controlling the supply of fluid to the said valve means, and being operative to supply fluid to said valve means on movement to the position in which fluid is released from the brake cylinder.

7. In an empty and load brake equipment, in combination, a brake pipe, a brake cylinder, an auxiliary reservoir, a load reservoir, valve means operated by an increase in the pressure of the fluid supplied thereto for supplying fluid under pressure from the brake pipe to the load reservoir, and a valve device controlling the supply of fluid from the brake pipe to the auxiliary reservoir, the supply of fluid from the auxiliary reservoir to the brake cylinder, and the release of fluid from the brake cylinder, said valve device also controlling the supply of fluid to the said valve means, and being operative to supply fluid to said valve means on movement to the position in which fluid is supplied from the brake pipe to the auxiliary reservoir.

8. In an empty and load brake equipment, in combination, a brake pipe, an auxiliary reservoir, a load reservoir, an empty brake cylinder, a load brake cylinder, a valve device controlling the supply of fluid from the auxiliary reservoir to the empty brake cylinder, a relay valve device operated by fluid under pressure supplied thereto for supplying fluid under pressure from the load reservoir to the load brake cylinder, and valve means subject to the opposing pressures of the fluid supplied to the empty brake cylinder and to the pressure of the fluid in a chamber and controlling the supply of fluid to the said relay valve device and to said chamber, biasing means associated with said valve means and operative to oppose movement of said valve means to the position to supply fluid under pressure to the relay valve device and to said chamber, and means subject to the pressure of the fluid in said chamber and opposing operation of the biasing means to resist movement of the valve means to the position to supply fluid under pressure to said relay valve and to said chamber.

9. In an empty and load brake equipment, in combination, an empty brake cylinder, a load brake cylinder, valve means responsive to variations in the pressure of fluid supplied thereto and controlling the supply of fluid under pressure to and the release of fluid under pressure from the load brake cylinder, a valve device controlling the supply of fluid to and the release of fluid from a passage through which fluid may be supplied to the empty brake cylinder and a passage through which fluid may be supplied to said valve means, and means to restrict the rate at which fluid is released from said empty brake cylinder, whereby said valve means is operative to release fluid from the load brake cylinder more rapidly than fluid is released from said empty brake cylinder.

10. In an empty and load brake equipment, in combination, an auxiliary reservoir, a load reservoir, an empty brake cylinder, a load brake cylinder, valve means operated by an increase in the pressure of the fluid supplied thereto to supply fluid under pressure from the load reservoir to the load brake cylinder, and operated on a decrease in the pressure of the fluid supplied thereto to release fluid under pressure from the load brake cylinder, a valve device controlling the supply of fluid from the auxiliary reservoir to a passage through which fluid may be supplied to the empty brake cylinder and to said valve means, and controlling the release of fluid from said empty brake cylinder and from said valve means, and means to control the rate at which fluid may be released from the empty brake cylinder by operation of said valve device, whereby the pressure of the fluid in the empty brake cylinder is reduced less rapidly than the pressure of the fluid supplied to said valve means, and whereby said valve means is operated to reduce the pressure of the fluid in the load brake cylinder more rapidly than the pressure of the fluid in the empty brake cylinder is reduced.

11. In an empty and load brake equipment, in combination, an auxiliary reservoir, a load reservoir, an empty brake cylinder, a load brake cylinder, valve means operated on an increase in the pressure of the fluid supplied thereto to supply fluid under pressure from the load reservoir to the load brake cylinder and operated on a reduction in the pressure of the fluid supplied thereto to release fluid under pressure from the load brake cylinder, a valve device controlling the supply of fluid to and the release of fluid from a passage through which fluid under pressure may be supplied to and released from the empty brake cylinder and a passage through which fluid may be supplied to and released from said valve means, the passage leading to the empty brake cylinder having a restricted portion interposed therein and operative to restrict the rate of flow of fluid to and from the brake cylinder through said restriction, a by-pass passage extending around said restriction, and a check valve interposed in said by-pass passage and operative to permit fluid to flow to the brake cylinder and to cut off the release of fluid from said brake cylinder by way of said by-pass passage.

12. In an empty and load brake equipment, in combination, an empty brake cylinder, a load brake cylinder, valve means operated on an increase in the pressure of the fluid supplied thereto to supply fluid under pressure to the load brake cylinder, and operated on a decrease in the pressure of fluid supplied thereto to release fluid under pressure from the load brake cylinder, a valve device for supplying fluid under pressure to and for releasing fluid under pressure from a passage through which fluid under pressure may be supplied to and released from the empty brake cylinder and a passage through which fluid under pressure may be supplied to and released from said valve means, the passage leading to the empty brake cylinder having a restriction interposed therein operative to restrict the rate of flow of fluid therethrough, a by-pass passage passing around said restriction, and a check valve interposed in said by-pass passage and operative to permit fluid to flow to the empty brake cylinder through said by-pass passage and to cut off the release of fluid from the empty brake cylinder by way of said by-pass passage.

13. In an empty and load brake equipment, in combination, an empty brake cylinder, a load brake cylinder, valve means operated on an increase in the pressure of the fluid supplied thereto to supply fluid under pressure to the load brake cylinder, and operated on a decrease in the pressure of fluid supplied thereto to release fluid under pressure from the load brake cylinder, a valve device for supplying fluid under pressure to and for releasing fluid under pressure from a passage through which fluid under pressure may be supplied to and released from the empty brake cylinder and a passage through which fluid under pressure may be supplied to and released from said valve means, the passage communicating with the brake cylinder having means associated therewith and operative to permit fluid to be released from the empty brake cylinder only at a rate less rapid than the rate at which fluid is supplied to the empty brake cylinder.

14. In an empty and load brake equipment, in combination, an empty brake cylinder, a load brake cylinder, valve means operative in response to an increase in the pressure of the fluid supplied thereto to supply fluid under pressure to the load brake cylinder and operative on a decrease in the pressure of the fluid supplied thereto to release fluid under pressure from the load brake cylinder, a valve device controlling the supply of fluid to and the release of fluid from a passage through which fluid under pressure may be supplied to and released from the empty brake cylinder and a passage through which fluid may be supplied to and released from said valve means, said valve means having means associated therewith and operative to prevent operation thereof to supply fluid under pressure to said load brake cylinder until fluid under pressure of a predetermined value is supplied thereto, whereby fluid under pressure is not supplied to the load brake cylinder until a predetermined pressure is established in the empty brake cylinder, the passage communicating with the empty brake cylinder having means associated therewith and operative to control the rate at which fluid is released from the empty brake cylinder, whereby the complete release of fluid from the empty brake cylinder is delayed until after fluid in the load brake cylinder is reduced substantially to atmospheric pressure.

15. In an empty and load brake equipment, in combination, a brake pipe, an auxiliary reservoir, a load reservoir, an empty brake cylinder, a load brake cylinder, valve means operated by an increase in the pressure of the fluid supplied thereto for supplying fluid from the load reservoir to the load brake cylinder, and operated by a decrease in the pressure of the fluid supplied thereto to release fluid from the load brake cylinder, a valve device operated by an increase in the pressure of the fluid in the brake pipe to effect the supply of fluid under pressure from the brake pipe to the auxiliary reservoir, to effect the supply of fluid under pressure from the brake pipe to the load reservoir through a passage independent of said auxiliary reservoir, and to release fluid under pressure from the empty brake cylinder and also from the said valve means, and operated by a reduction in the pressure of the fluid in the brake pipe to supply fluid under pressure from the auxiliary reservoir to the empty brake cylinder and to supply fluid under pressure to the said valve means, and a change-over valve device for conditioning the equipment for empty operation or load operation, said change-over valve device controlling the communication through which fluid is supplied from the brake pipe to the load reservoir, and controlling the communication through which fluid is supplied to and released from the said valve means.

16. In an empty and load brake equipment, in combination, an empty brake cylinder, means operative to supply fluid under pressure to said brake cylinder, a load brake cylinder, means for increasing the fluid pressure in the load brake cylinder according to the increase in fluid pressure in a chamber, a valve device subject to the opposing pressures of the fluid supplied to the empty brake cylinder and said chamber for controlling the supply of fluid under pressure to said chamber, a spring, and a movable abutment subject to the opposing pressures of said spring and said chamber for opposing movement of said valve device.

17. In an empty and load brake equipment, in combination, an empty brake cylinder, means operative to supply fluid under pressure to said brake cylinder, a load brake cylinder, means for increasing the fluid pressure in the load brake cylinder according to the increase in fluid pressure in a chamber, a valve device for controlling the supply of fluid under pressure to said chamber comprising a valve and a movable abutment subject to the opposing pressures of the fluid which is supplied to the empty brake cylinder and said chamber for operating said valve, a yielding resistance means, and a movable abutment subject to the opposing pressures of said chamber and said yielding resilient means for opposing movement of said valve device to supply fluid under pressure to said chamber.

18. In an empty and load brake equipment, in combination, an empty brake cylinder, a load brake cylinder, means for supplying fluid under pressure to the empty brake cylinder, a relay valve device operated upon an increase in fluid pressure in a chamber for supplying fluid under pressure to the load brake cylinder, valve means subject to the opposing pressures of the fluid supplied to the empty brake cylinder and said chamber and operated by an increase in pressure of fluid supplied to the empty brake cylinder for supplying fluid under pressure to said chamber, and biasing means subject to the pressure of fluid in said chamber for opposing movement of said valve means to supply fluid to said chamber.

19. In an empty and load brake equipment, in combination, an empty brake cylinder, a brake controlling valve device operative to supply fluid under pressure to, and to release fluid under pressure from said brake cylinder, a load brake cylinder, means for supplying fluid under pressure to and releasing fluid under pressure from the load brake cylinder in accordance with the supply of fluid to and the release of fluid from a chamber, a valve device subject to the opposing pressures of the fluid supplied to the empty brake cylinder and said chamber for controlling the supply of fluid under pressure to said chamber, a spring, a movable abutment subject to the opposing pressures of the fluid in said chamber and of said spring for opposing movement of the valve device to a position to supply fluid to said chamber, and means to control the release of fluid from said brake cylinders and operative to effect a more rapid relase of fluid from the load brake cylinder than from the empty brake cylinder.

20. In an empty and load brake equipment, in combination, an empty brake cylinder, a brake controlling valve device operative to supply fluid under pressure to, and to release fluid under pressure from said brake cylinder, a load brake cylinder, means for supplying fluid under pressure to and releasing fluid under pressure from the load brake cylinder in accordance with the supply of fluid to and the release of fluid from a chamber, a valve device subject to the opposing pressures of the fluid supplied to the empty brake cylinder and said chamber for controlling the supply of fluid under pressure to said chamber, a spring, a movable abutment subject to the opposing pressures of the fluid in said chamber and of said spring for opposing movement of the valve device to a position to supply fluid to said chamber, and means to control the release of fluid from said brake cylinders and operative to effect a more rapid release of fluid from the load brake cylinder than from the empty brake cylinder, said means comprising a choke interposed in the passage through which fluid is released from the empty brake cylinder.

21. In an empty and load brake equipment, in combination, an empty brake cylinder, a brake controlling valve device operative to supply fluid under pressure to, and to release fluid under pressure from said brake cylinder, a load brake cylinder, means for supplying fluid under pressure to and releasing fluid under pressure from the load brake cylinder in accordance with the supply of fluid to and the release of fluid from a chamber, a valve device subject to the opposing pressure of the fluid supplied to the empty brake cylinder and said chamber for controlling the supply of fluid under pressure to said chamber, a spring, a movable abutment subject to the opposing pressures of the fluid in said chamber and of said spring for opposing movement of the valve device to a position to supply fluid to said chamber, and means to control the release of fluid from said brake cylinders and operative to effect a more rapid release of fluid from the load brake cylinder than from the empty brake cylinder, said means comprising valve means subject to and operated upon a reduction in the pressure of the fluid in the load brake cylinder to a predetermined value to permit communication through a passage through which fluid may be released from the load brake cylinder, and means controlled by the brake controlling valve device and operative to permit communication through said passage on movement of said device to a position to release fluid from said empty brake cylinder.

22. In a fluid pressure brake, in combination, a brake cylinder, a brake controlling valve device operative to control a passage through which fluid under pressure may be supplied to and released from the brake cylinder, valve means subject to and operated upon a reduction in the pressure of the fluid in the brake cylinder to a predetermined value to permit communication through a passage through which fluid may be released from the brake cylinder, and means controlled by the brake controlling valve device and operative to permit communication through said last named passage on movement of the brake controlling valve device to a position to effect the release of fluid under pressure from the brake cylinder by way of the first named passage.

23. In a fluid pressure brake, in combination, a brake cylinder, a brake controlling valve device operative to control a passage through which fluid under pressure may be supplied to and released from the brake cylinder, valve means subject to and operated upon a reduction in the pressure of the fluid in the brake cylinder to a predetermined value to permit communication through a passage through which fluid may be released from the brake cylinder, valve means operated by an increase in the pressure of the fluid supplied thereto to permit communication through said last-named passage, and means controlled by the brake controlling valve device for supplying fluid under pressure to said valve means on movement of the brake controlling valve device to a position to effect the release of fluid from the brake cylinder through said first named passage.

24. In a fluid pressure brake, in combination, an empty brake cylinder, a load brake cylinder, a brake controlling valve device operative to effect the supply of fluid to and the release of fluid from the empty brake cylinder and the load brake cylinder, means controlled by the brake controlling valve device and controlling a passage through which fluid may be released from the load brake cylinder, and operative on movement of the brake controlling valve device to a position to release fluid from said brake cylinders to permit communication through said passage, and valve means subject to and operated upon a reduction in the pressure of the fluid in the load brake cylinder to permit communication through said passage.

25. In an empty and load brake equipment, in combination, a brake pipe, an auxiliary reservoir, a load reservoir, a passage by-passing the auxiliary reservoir through which fluid under pressure may be supplied from the brake pipe to the load reservoir, valve means operative on an increase in the pressure of the fluid supplied thereto to establish communication through said passage, and a valve device subject to the opposing pressures of the fluid in the brake pipe and in the auxiliary reservoir for supplying fluid under pressure to said valve means.

26. In an empty and load brake equipment, in combination, a brake pipe, an auxiliary reservoir, a load reservoir, valve means operated upon a predetermined increase in fluid pressure for opening a communication through which fluid under pressure is supplied directly from the brake pipe to said load reservoir, and a valve device subject to the opposing pressures of fluid in the brake pipe and in the auxiliary reservoir for controlling the supply of fluid under pressure for operating said valve means.

27. In an empty and load brake equipment, in combination, a brake pipe, an auxiliary reservoir, a load reservoir, a passage by-passing the auxiliary reservoir through which fluid under pressure may be supplied from the brake pipe to the load reservoir, valve means operative on an increase in the pressure of the fluid supplied thereto to establish communication through said passage, and a valve device subject to the opposing pressures of the fluid in the brake pipe and in the auxiliary reservoir and controlling the supply of fluid under pressure from the auxiliary reservoir to said valve means and also controlling the supply of fluid under pressure from the brake pipe to the auxiliary reservoir.

28. In an empty and load brake equipment, in combination, an empty brake cylinder, a load brake cylinder, a relay valve device operated upon an increase in the pressure of the fluid in a chamber to supply fluid under pressure to the load brake cylinder and operated on a decrease in the pressure of the fluid in said chamber to release fluid under pressure from the load brake cylinder, valve means subject to the opposing pressures of said relay valve chamber and of the fluid in an operating chamber for controlling the supply of fluid under pressure to and the release of fluid under pressure from the relay valve chamber, valve mechanism for controlling the supply and release of fluid under pressure to and from a passage through which fluid may be supplied to and released from the empty brake cylinder and a passage through which fluid may be supplied to and released from said operating chamber, the passage leading to the empty brake cylinder having a restriction interposed therein and operative to restrict the rate of fluid through said passage, a by-pass passage extending around said restriction, and a check valve interposed in said by-pass passage and operative to permit fluid to flow through said passage to the brake cylinder and to cut off the flow of fluid from the brake cylinder through said passage.

29. In an empty and load brake equipment, in combination, a load brake cylinder, an empty brake cylinder, an auxiliary reservoir, a load reservoir, means for supplying fluid under pressure from the auxiliary reservoir to the empty brake cylinder, a relay valve device operated upon an increase in the pressure of the fluid in a chamber to supply fluid under pressure from the load reservoir to the load brake cylinder, and valve mechanism controlled by the opposing pressures of said chamber and of the empty brake cylinder for supplying fluid under pressure from the empty brake cylinder to said chamber.

30. In an empty and load brake equipment, in combination, a load brake cylinder, an empty brake cylinder, an auxiliary reservoir, a load reservoir, a relay valve device operated upon an increase in the pressure of the fluid in a chamber to supply fluid under pressure from the load reservoir to the load brake cylinder, valve mechanism controlled by the opposing pressures of said relay device chamber and in an operating chamber for supplying fluid under pressure from said operating chamber to the relay valve device chamber, and valve means for supplying fluid under pressure from the auxiliary reservoir to the empty brake cylinder and for also supplying fluid under pressure to said operating chamber at the pressure of the fluid supplied to the empty brake cylinder.

31. In an empty and load brake mechanism, in combination, an empty brake cylinder, a load brake cylinder, an auxiliary reservoir, a load reservoir, a relay valve device operated upon an increase in the pressure of the fluid in a chamber for supplying fluid under pressure from the load reservoir to the load brake cylinder, valve mechanism controlled by the opposing pressures of the fluid in the relay valve device chamber and in an operating chamber for supplying fluid under pressure from the operating chamber to the relay valve device chamber, a spring, movable abutment means subject to the opposing pressures of said spring and of the fluid in the relay valve device chamber for opposing movement of the valve mechanism to the position to supply fluid under pressure to the relay device chamber, and valve means for supplying fluid under pressure from the auxiliary reservoir to the empty brake cylinder and for also supplying fluid under pressure to said operating chamber at the pressure of the fluid supplied to the empty brake cylinder.

32. In an empty and load brake equipment, in combination, a brake pipe, an auxiliary reservoir, a load reservoir, a brake cylinder, means operated upon an increase in fluid pressure for opening a communication through which fluid under pressure is supplied directly from the brake pipe to the load reservoir, and a valve device subject to the opposing pressures of the brake pipe and auxiliary reservoir and operative to control the supply of fluid under pressure from the auxiliary reservoir to the brake cylinder and to release fluid from the brake cylinder, and also operative in the position in which fluid is released from the brake cylinder to supply fluid under pressure to said means.

33. In an empty and load brake equipment, in combination, a brake pipe, an auxiliary reservoir, a load reservoir, a brake cylinder, a valve device comprising a body having therein a valve chamber constantly connected to said auxiliary reservoir and having valve means subject to the opposing pressures of the fluid in the brake pipe and of the fluid in the valve chamber for supplying fluid from the brake pipe to said valve chamber and thereby to the auxiliary reservoir, said valve means also controlling the supply of fluid from the brake pipe to the load reservoir through a communication which by-passes the valve chamber and the auxiliary reservoir.

34. In a vehicle empty and load brake equipment, in combination, a body, a member supported on said body and oscillatable about an axis between a position in which it conditions the brake equipment for empty operation and a position in which it conditions the brake equipment for load operation, a toothed element secured to said member, another toothed element pivotally supported on said body and having teeth meshing with the teeth on the first named element, means for turning the last named element and thereby turning the other element and said member, the body having projecting means associated therewith and arranged to be engaged by means associated with said member on movement of the said member to either its empty or its load position to prevent movement of said member beyond said positions, one of said elements having a spring pressed plunger associated therewith, said body having spaced recesses formed therein into which said plunger is adapted to extend, said recesses being positioned so that the plunger extends thereinto only on movement of said member substantially to the positions determined by the projecting means, the plunger yieldingly resisting movement of said member away from the positions in which the plunger extends into said recesses.

35. In a vehicle empty and load brake equipment, in combination, a changeover valve device having a body, a cover detachably secured to said body and cooperating therewith to form a chamber, a member supported on said body and oscillatable about an axis between positions in which it adjusts the valve device to condition the brake equipment for empty operation and for load operation, a toothed element mounted in said chamber and secured to said member, another toothed element mounted in said chamber and having teeth meshing with the teeth on the first named element, means for turning the last named element and thereby turning the other element and said member, said cover carrying projecting means which extends into said chamber and is arranged to be engaged by one of said elements on movement of the member to either its empty or load position to prevent movement of said member beyond said positions, one of said elements having a spring pressed plunger associated therewith, said body having recesses formed therein into which the plunger is adapted to extend, said recesses being positioned so that the plunger extends thereinto only on movement of said member substantially to the positions determined by the projecting means, the plunger yieldingly resisting movement of the said member away from the positions in which the plunger extends into said recesses.

ELLIS E. HEWITT.
ELLERY R. FITCH.